United States Patent [19]
Mundinger et al.

[11] 3,885,506
[45] May 27, 1975

[54] RAILROAD CAR WITH DEPRESSED FLOOR

[75] Inventors: William D. Mundinger, Canfield, Ohio; Richard C. Snyder, Michigan City, Ind.

[73] Assignee: Pullman Incorporated, Chicago, Ill.

[22] Filed: Apr. 8, 1974

[21] Appl. No.: 458,741

[52] U.S. Cl. ............... 105/367; 105/414; 105/422
[51] Int. Cl. ............................................. B61d 17/00
[58] Field of Search ........... 105/366 R, 367, 368 R, 105/376, 412, 414, 422

[56] References Cited
UNITED STATES PATENTS
| | | | |
|---|---|---|---|
| 3,216,165 | 11/1965 | Shaver | 105/422 X |
| 3,490,388 | 1/1970 | Lundvall et al. | 105/376 X |
| 3,814,028 | 6/1974 | Adler | 105/422 |

Primary Examiner—M. Henson Wood, Jr.
Assistant Examiner—Gene A. Church
Attorney, Agent, or Firm—Richard J. Myers

[57] ABSTRACT

A high cubic capacity railroad boxcar that is provided with a longitudinally extending depressed nailable steel floor section disposed on each side of a longitudinally extending center sill structure, the top surface of the floor sections being at the same elevation as the surface of a plate over the center sill structure, the outside lateral margins of each floor section having a removable inverted filler channel member positioned in a longitudinal runner recess adjacent a car angle member and side sill. Each filler channel member may be replaced with a bulkhead floor track in the form of a slotted runner member or a rack gear member and cooperate with a similar overhead track for receiving, locating and restraining removable bulkheads later added to the car by a lading shipper as may be required.

22 Claims, 7 Drawing Figures

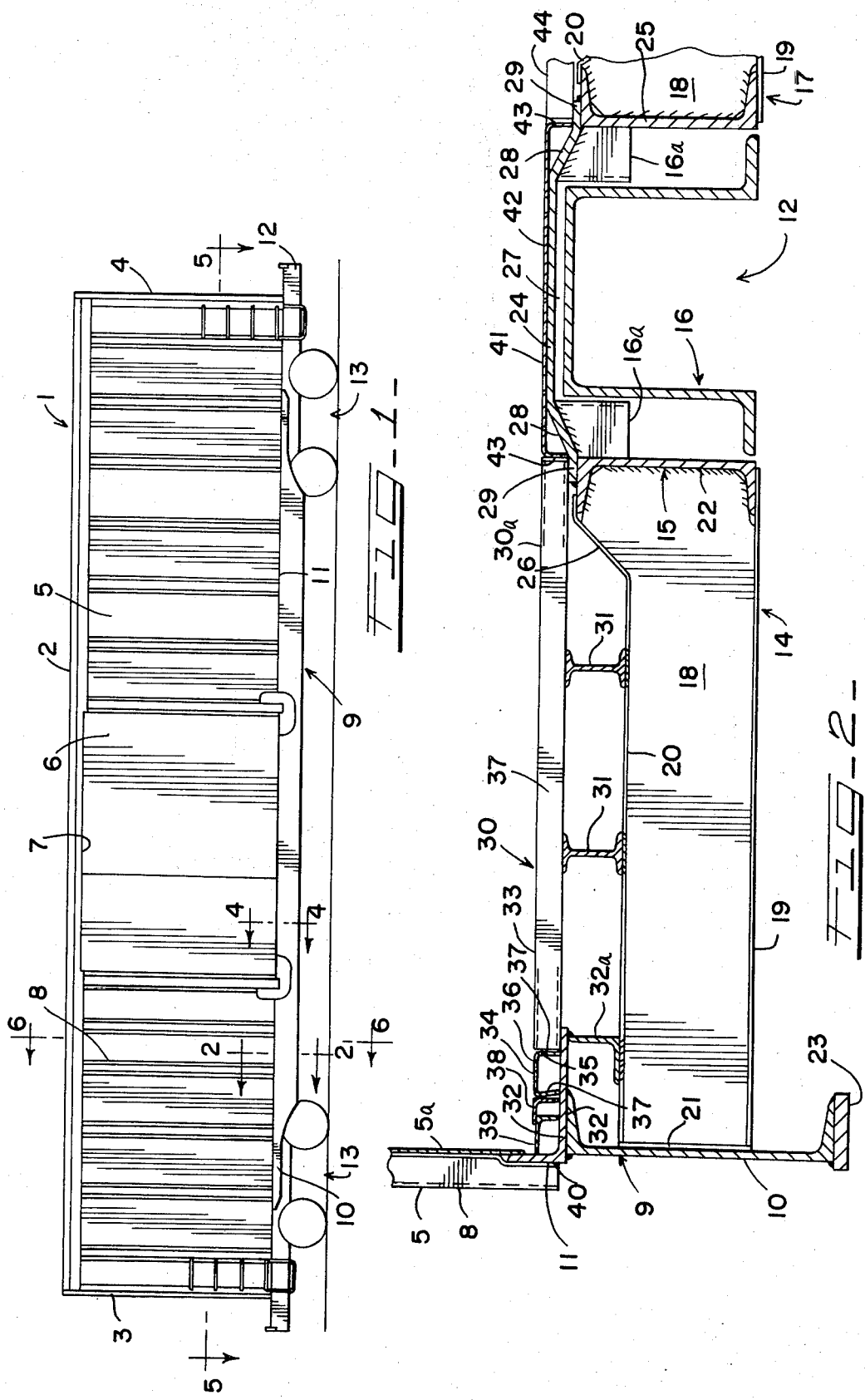

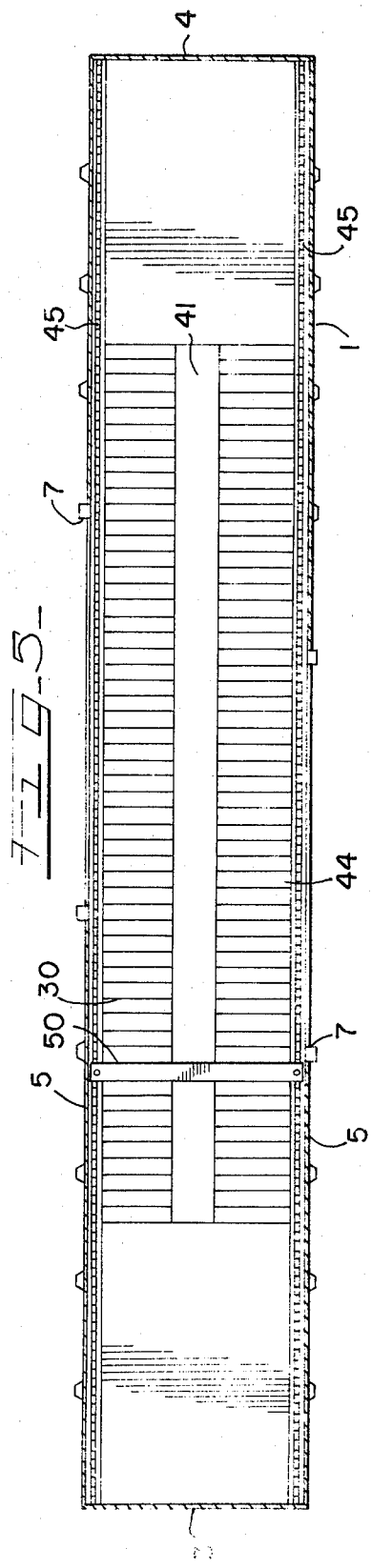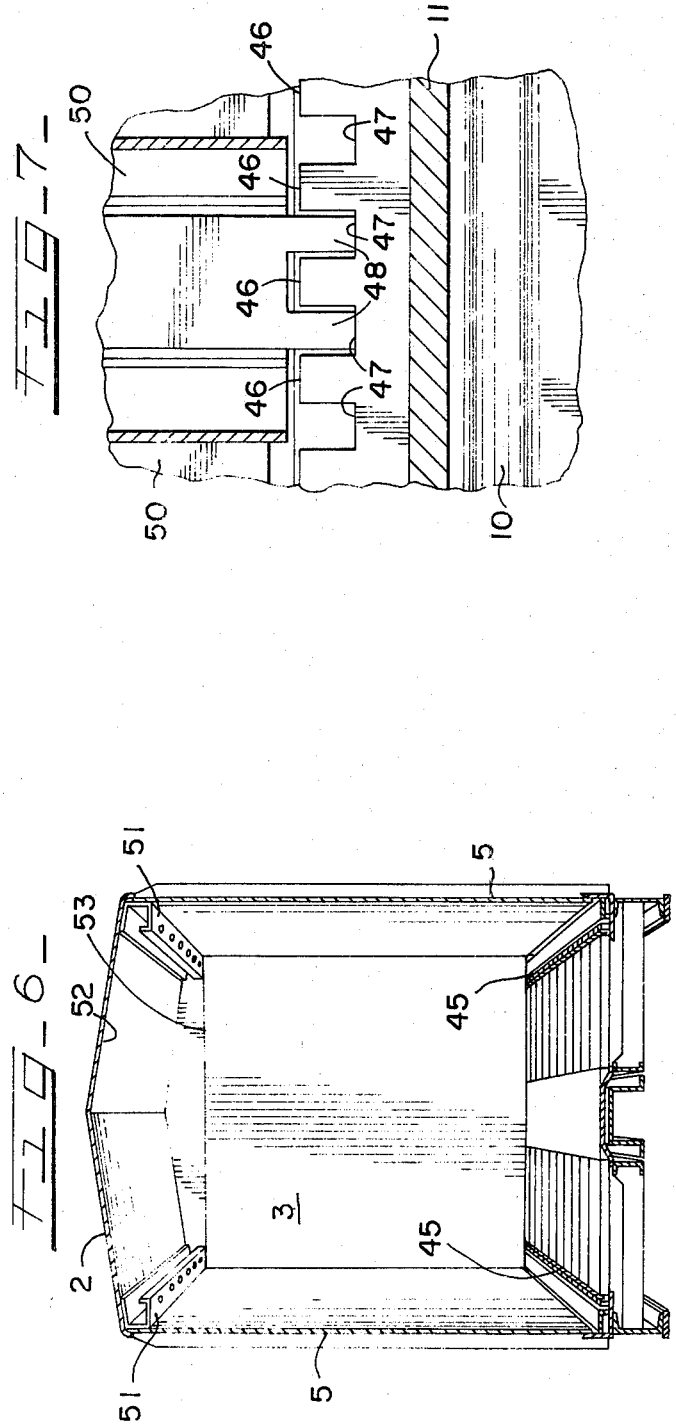

RAILROAD CAR WITH DEPRESSED FLOOR

BACKGROUND OF THE INVENTION

1. Field of the Invention

This invention relates to the construction of railroad freight cars, such as boxcars, where transverse bulkheads divide the interior into load confining compartments, and in particular to car floor constructions.

2. Description of the Prior Art

It has been known to provide various interior freight car constructions to increase the volumetric capacity of the car. However, such construction alterations have been limited by the car center sill height. It is this problem that the instant invention resolves.

SUMMARY OF THE INVENTION

It is a general object of this invention to provide an improved freight railroad car, such as a boxcar, which has increased volumetric capacity by recessing the car floor sections about the center sill structure of the car underframe.

The invention provides an improved nailable floor construction that includes a pair of longitudinal floor sections, one on each side of the center sill where the top of the floor sections, the top of a plate on the center sill, and the top of the side sill all lie in the same horizontal plane. The invention further provides a removable longitudinal floor section between the side sill and the floor section and in a longitudinal runner recess for alternately receiving a transverse bulkhead supporting rack type track cooperating with a ceiling bulkhead supporting track thereabove.

BRIEF DESCRIPTION OF THE DRAWINGS

FIG. 1 is a side elevation view of a railroad boxcar with the improved inventive floor design;

FIG. 2 is a sectional view taken along line 2—2 of FIG. 1;

FIG. 5 is a plan view taken along line 5—5 of FIG. 1 of the floor construction with parts removed;

FIG. 6 is a partial perspective view with parts missing of the bulkhead track portion taken along line 6—6 of FIG. 1; and FIG. 7 is a partial enlarged side view of the bulkhead and floor track.

DESCRIPTION OF THE PREFERRED EMBODIMENT

Figure 3:
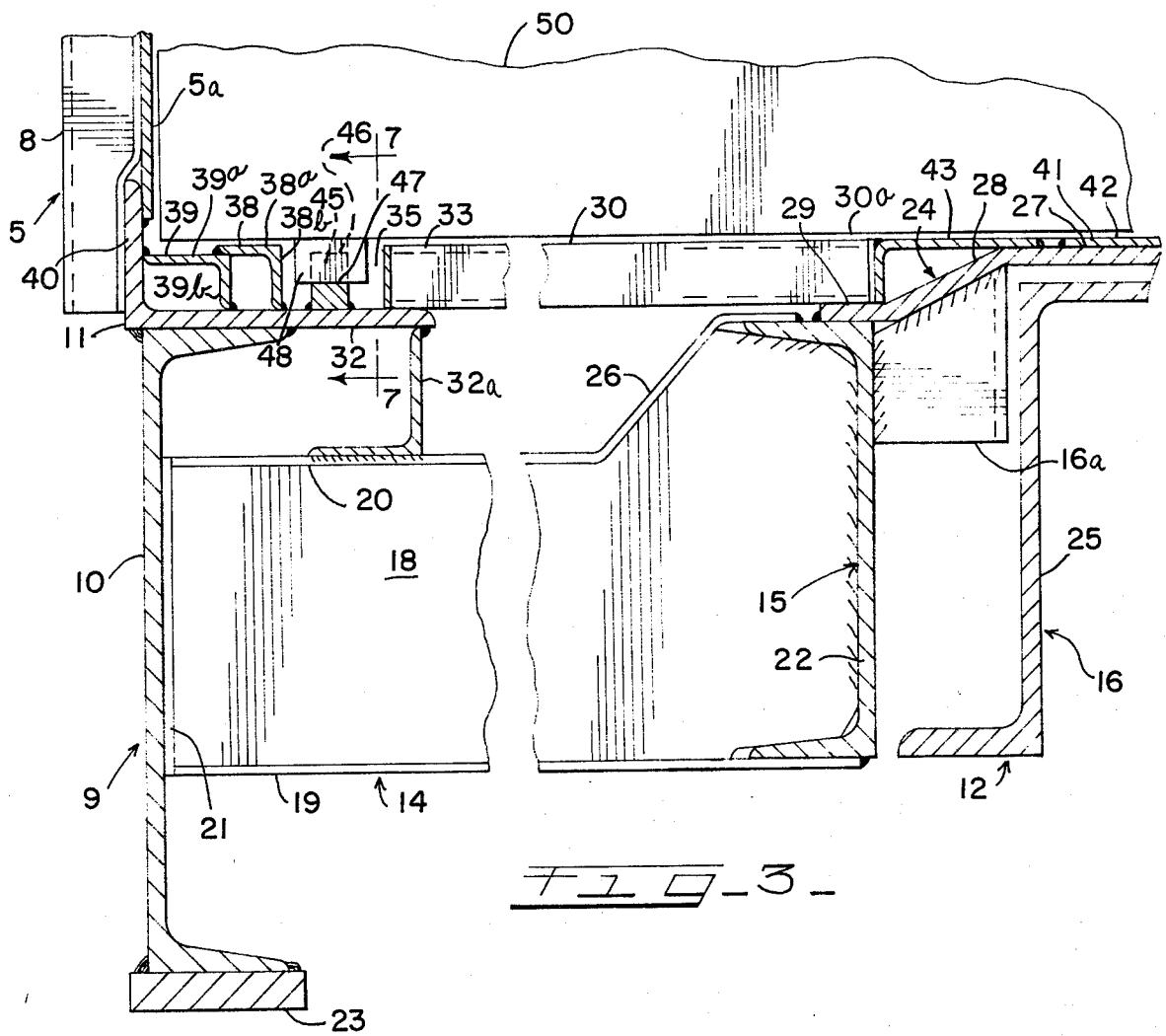
FIG. 3 is a partial enlarged sectional view of that shown in FIG. 2 but with the bulkhead rack track replacing the removable inverted channel.

With reference to the drawings and in particular with reference to FIG. 1, there is shown a railroad freight car 1 of the boxcar type which has a roof 2 and ends 3 and 4, and sides 5 each with sliding door means 6 in a doorway 7 and side posts 8. Each car has an underframe 9 which includes the usual side sill reinforcements 10, side sills 11, center sill structure 12, and trucks 13.

Figure 4:
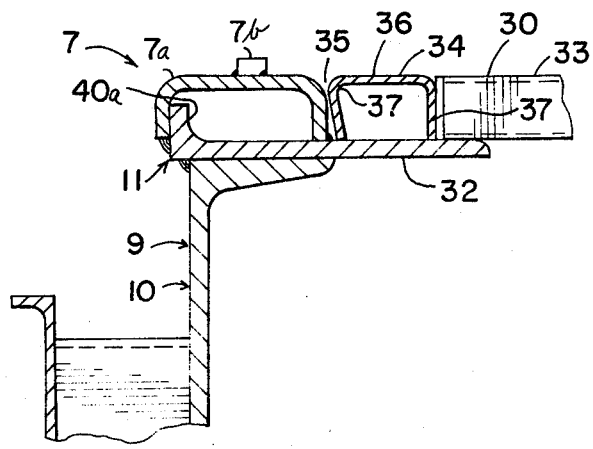
FIG. 4 is a sectional view taken along line 4—4 of FIG. 1.

In FIG. 2 it is seen that the side sill 11 is an L-shaped angle member from which extends downwardly the channel-shaped side sill reinforcement 10 which connects with a transversely extending horizontal crossmember 14 that extends inwardly to the center sill structure 12 which includes a fixed or stationary center sill 15 and a conventional sliding center sill 16. Another crossmember 17 extends from the outer side of the center sill structure to the other side (not shown) of the car which has the same type of side construction including a side sill, side sill reinforcement, etc. The crossmember 14 or 17 includes a vertical web 18, a bottom plate or flange 19, and a top plate or flange 20, and an upright outer end flange 21 between the upright channel member 22 of the fixed sill and the side sill reinforcement 10 which has a bottom reinforcement plate 23. The fixed sill has a top cover plate 24 joined to the member 22 and to the other stationary center sill upright channel member 25. The inner end portion 26 of the top crossmember plate 20 slopes up onto the top of the channel member 22. The fixed sill cover plate 24 is spaced above the stationary sill 15 and has flat top portion 27, outward and downward sloping side portions 28 and lateral horizontal end portions 29 on the tops of the channels 22 and 25. The nailable steel floor section 30 (see FIG. 2) has its right upright end 30a on the left flange end portion 29 adjacent the left sloped portion 28 and also sits on longitudinal I-beam stringers 31 (stringers are also on left side of car) and side sill bottom flange 32 which sits on longitudinal angle member 32a. The left end portion 33 of the nailable steel floor section 30 is adjacent the removably attached runner channel member 34 located in the elongated longitudinal passage, runner or recessed area 35. The construction of the nailable steel floor section 30 is shown, for instance, in U.S. Pat. No. 3,216,165 issued on Nov. 9, 1965 to William R. Shaver. The runner channel member 34 has a top 36 and sides 37 and has on its left laterally spaced overlapping closure angle members 38 and 39. As better seen in FIG. 3, the angle member 38 has a top flange 38a and a side flange 38b and angle member 39 has a top flange 39a and a side flange 39b. The angle plate flange 39a extends and attaches to upright flange 40 of the side sill 11. A central longitudinal steel plate or floor cap structure 41 is on the stationary sill top plate 24 and has a flat top member 42 and short side angle members 43 engaging slope portions 28 and 29, the right end side angle member 43 being adjacent another longitudinal nailable steel floor section 44 which is identical to floor section 30 but on the right side of the center sill structure 12. The horizontal tops of the angle members 38 and 39 are substantially in the same horizontal plane as the tops of members 38, 30, 41 and 44, these members being flush with one another so that a smooth floor is presented. Thus the nailable steel floor sections are recessed or depressed at center sill level to provide for increased volume within the boxcar. The sliding sill 16 is provided with guides 16a and the car sides 5 are provided with side sheeting 5a. It will be appreciated that the construction of the car on either side of the center sill structure is identical. FIG. 4 illustrates the car doorway condition in cross-section which includes the inverted U-shaped floor flush threshold plate 7a, a reduced side sill upright portion 40a and load rack retainer bar to hold in the load. The doorway 7 is a door track 7c and door track bracket 7d. The runner inverted filler channel member 34 on each side of the car floor may be removed and replaced by a bulkhead engageable track member 45 as seen in FIGS. 3, 5, 6 and 7. The track is in the form of a rack and has teeth 46 and trough portions or recessed portions 47 which receive teeth 48 of a removable transverse bulkhead 50 as seen in FIGS. 3, and 5–7. Similar bulkhead tracks 51 are located in the car ceiling 52 for retaining the top 53 of the divider bulkhead 50 as seen in FIG. 6. The bulkhead may be thus moved to various positions along the tracks 45 and 51 and restrained thereat by teeth 46 and 48.

The foregoing description and drawings merely explain and illustrate the invention insofar as the appended claims are so limited, as those skilled in the art who have the disclosure before them will be able to make modifications and variations therein without departing from the scope of the invention.

What is claimed is:

1. A railroad car for high cubic capacity interior design including a recessed floor construction and comprising:
   a pair of side sills,
   a center sill structure spaced between the side sills,
   said floor construction including a floor structure having a pair of recessed floor units, one on either side of and extending substantially below the top of the center sill structure and inwardly of a respective side sill, and
   said floor structure having a longitudinal recess portion between each floor unit and its adjacent side sill and a removable filler within said recess portion.

2. The invention according to claim 1, and
   each of said floor units having its outer lateral end supported by a respective side sill and having its inner lateral end supported by the center sill structure.

3. A railroad car for high cubic capacity interior design including a recessed floor construction and comprising:
   a pair of side sills,
   a center sill structure spaced between the side sills,
   said floor construction including a floor structure having a pair of recessed floor units, one on either side of and extending substantially below the top of the center sill structure and inwardly of a respective side sill, the recessed floor units having top surfaces, and
   said floor structure including a flat plate means over the center sill structure and connecting with each floor unit and having a top surface generally flush with the top surfaces of the floor units to present a generally smooth horizontal floor.

4. The invention according to claim 2, and
   each of said floor units having its outer lateral end supported by the side sill.

5. The invention according to claim 3, and
   each of said floor units having its outer lateral end supported by a respective side sill and having its inner lateral end supported by the center sill structure.

6. The invention according to claim 3, and
   said floor structure having a longitudinal runner recess portion between each floor unit and its adjacent side sill and a removable filler within said recess portion adapted to be removed and replaced by a transversely extending bulkhead track for locating and holding a load divider bulkhead in one of various longitudinal positions within the car.

7. A railroad car for high cubic capacity interior design including a recessed floor construction and comprising:
   a pair of side sills,
   a center sill structure spaced between the side sills, and
   said floor construction including a floor structure having a pair of recessed floor units, one on either side of and extending substantially below the top of the center sill structure and inwardly of a respective side sill,
   said floor structure having a longitudinal runner recess portion between each floor unit and its adjacent side sill and a removable filler within said recess portion adapted to be removed and replaced by a transversely extending bulkhead track for locating and holding a load divider bulkhead in one of various longitudinal positions within the car.

8. A railroad car for high cubic capacity interior design including a recessed floor construction and comprising:
   a pair of side sills,
   a center sill structure spaced between the side sills, and
   said floor construction including a floor structure having a pair of recessed floor units, one on either side of and extending substantially below the top of the center sill structure and inwardly of a respective side sill,
   said floor structure having a longitudinal runner recess portion between each floor unit and its adjacent side sill and a removable filler within said recess portion adapted to be removed and replaced by a transversely extending bulkhead track for locating and holding a load divider bulkhead in one of various longitudinal positions within the car, and
   said floor structure including closure means between a runner recess portion and an adjacent side sill, the top surface of the closure means, the runner recess portion and the side sill lying generally in the same horizontal plane.

9. A railroad car for high cubic capacity interior design including a recessed floor construction and comprising:
   a pair of side sills,
   a center sill structure spaced between the side sills, and
   said floor construction including a floor structure having a pair of recessed floor units, one on either side of and extending substantially below the top of the center sill structure and inwardly of a respective side sill;
   said floor structure having a longitudinal runner recess portion between each floor unit and its adjacent side sill and a removable filler within said recess portion adapted to be removed and replaced by a transversely extending bulkhead track for locating and holding a load divider bulkhead in one of various longitudinal positions within the car, and
   the removable filler lying generally in the same horizontal plane as its adjacent floor unit.

10. A railroad car for high cubic capacity interior design including a recessed floor construction and comprising:
    a pair of side sills,
    a center sill structure spaced between the side sills, and
    said floor construction including a floor structure having a pair of recessed floor units, one on either side of and extending substantially below the top of the center sill structure and inwardly of a respective side sill, each floor unit being recessingly supported on a side sill and said adjacent center sill structure with the top portion of the center sill structure extending approximately in the same general horizontal plane as the top of the floor unit.

11. A railroad car for high cubic capacity interior design including a recessed floor construction and comprising:

a pair of side sills, a center sill structure spaced between the side sills, and said floor construction including a floor structure having a pair of recessed floor units, one on either side of and extending substantially below the top of the center sill structure and inwardly of a respective side sill, a top floor plate on the top of the center sill structure being in the same horizontal plane as the top of each of the floor units.

12. A railroad car for high cubic capacity interior design including a recessed floor construction and comprising:

a pair of side sills, a center sill structure spaced between the side sills, and said floor construction including a floor structure having a pair of recessed floor units, one on either side of and extending, substantially below the top of the center sill structure and inwardly of a respective side sill, each of said floor units being supported by a crossmember spaced between a respective side portion of the car and a respective side of the center sill structure.

13. The invention according to claim 12, and stringer means being interposed between each floor unit and each crossmember.

14. A railroad car for high cubic capacity interior design including a recessed floor construction and comprising:

a pair of side sills, a center sill structure spaced between the side sills, and said floor construction including a floor structure having a pair of recessed floor units, one on either side of and extending substantially below the top of the center sill structure and inwardly of a respective side sill, said floor structure having a longitudinal runner recess portion between each floor unit and its adjacent side sill and a removable filler within said recess portion adapted to be removed and replaced by a transversely extending bulkhead track for locating and holding a load divider bulkhead in one of various longitudinal positions within the car, and a longitudinal doorway threshold plate having a top surface in the same horizontal plane as the top of the removable filler and laterally outwardly adjacent thereto.

15. The invention according to claim 14, and the threshold plate being supported by its respective side sill.

16. The invention according to claim 15, and a load rack retainer on the threshold plate.

17. A railroad car for high cubic capacity interior design including a recessed floor construction and comprising:

a pair of side sills, a center sill structure spaced between the side sills, said floor construction including a floor structure having a pair of recessed floor units, one on either side of and extending substantially below the top of the center sill structure and inwardly of a respective side sill, the recessed floor units having top surfaces, said floor structure including a flat plate means over the center sill structure and connecting with each floor unit and having a top surface generally flush with the top surfaces of the floor units to present a generally smooth horizontal floor, each of said floor units having its outer lateral end supported by a respective side sill and having its inner lateral end supported by the center sill structure, said floor structure having a longitudinal runner recess portion between each floor unit and its adjacent side sill and a removable filler within said recess portion adapted to be removed and replaced by a transversely extending bulkhead track for locating and holding a load divider bulkhead in one of various longitudinal positions within the car, and the removable filler lying generally in the same horizontal plane as its adjacent floor unit.

18. The invention according to claim 17, and each of said floor units being supported by a crossmember spaced between a respective side portion of the car and a respective side of the center sill structure.

19. The invention according to claim 18, and stringer means being interposed between each floor unit and each crossmember.

20. A railroad car for high cubic capacity interior design including a recessed floor construction and comprising:

a pair of side sills, a center sill structure spaced between the side sills, said floor construction including a floor structure having a pair of recessed floor units, one on either side of and extending substantially below the top of the center sill structure and inwardly of a respective side sill, a longitudinal runner recess portion between each side sill and floor unit, and a load divider bulkhead rack in each recess portion.

21. The invention according to claim 20, and load divider bulkhead rack means in the ceiling of the car to cooperate with the floor racks.

22. The invention according to claim 20, and a transverse load divider bulkhead coupling with said racks.

* * * * *